Feb. 14, 1956 A. C. ERICKSON 2,734,449
PIE DISH
Filed Oct. 10, 1952
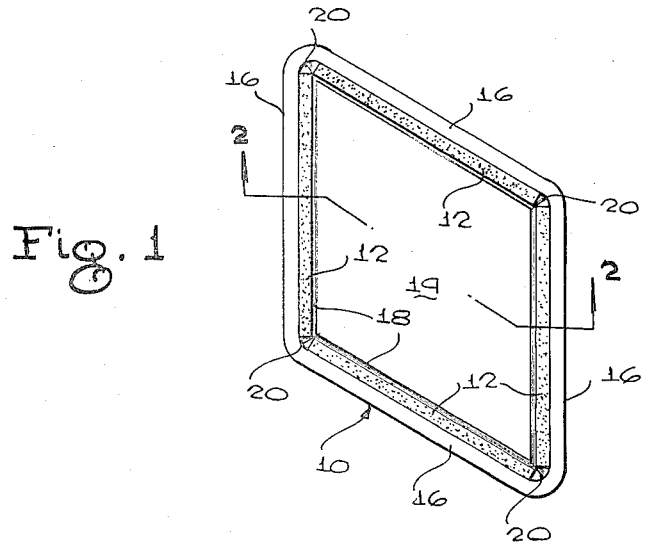
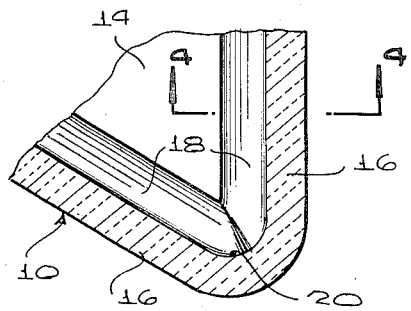
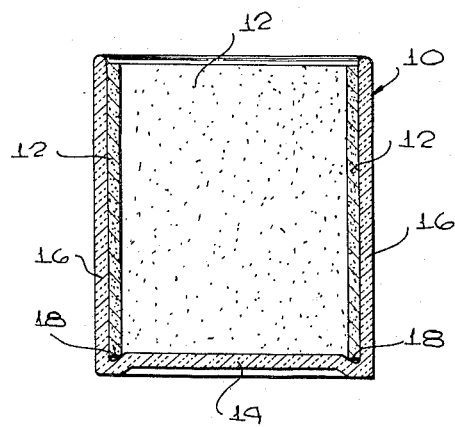
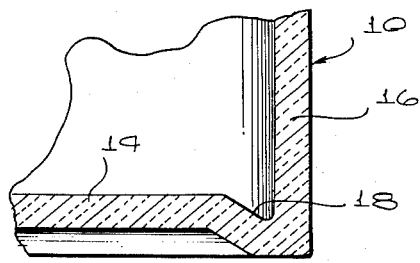
INVENTOR.
ARTHUR C. ERICKSON
BY
McMorrow, Berman & Davidson
ATTORNEYS United States Patent Office 2,734,449
Patented Feb. 14, 1956

2,734,449
PIE DISH
Arthur C. Erickson, Denver, Colo.
Application October 10, 1952, Serial No. 314,168
1 Claim. (Cl. 99—428)

This invention relates to a pie dish, and more particularly, has reference to a pie dish which is formed to a diamond shape, the particular shape of the pie dish being adapted to facilitate the use, in said dish, of graham crackers for forming a pie crust.

In many instances, graham crackers or the like are used for making pie crusts, the use of said crackers being particularly desirable in that it eliminates the necessity of mixing pie crust, a task which is ordinarily time consuming.

The use of graham crackers in making pie crust presents, however, certain difficulties, in that it is difficult to hold the crackers in proper position while the pie filling is being poured into the pie dish.

In view of the above, the main object of the present invention is to provide a pie dish which is particularly adapted for supporting a plurality of graham crackers in positions in which said crackers will remain properly located, while filling is being poured into the dish and while the pie is being baked.

Still another object is to provide a pie dish of the type stated which is so designed as to be particularly adapted for making deep dish pies with graham crackers being used as the crust.

Yet another object is to provide a pie dish which can be used not only for baking pies, but also, as a dish adapted to hold a graham cracker sundae.

A further object is to provide a pie dish which will be particularly designed to permit the easy and speedy removal of the pie.

Other objects will appear from the following description, the claims appended thereto, and from the annexed drawing, in which like reference characters designate like parts throughout the several views, and wherein:

Figure 1 is a top plan view of a pie dish formed in accordance with the present invention, a plurality of graham crackers being illustrated in supported position therein;

Figure 2 is a sectional view taken on line 2—2 of Figure 1;

Figure 3 is an enlarged, fragmentary, detail sectional view showing one corner of the pie dish; and Figure 4 is a fragmentary, detail sectional view taken substantially on line 4—4 of Figure 3.

Referring to the drawings in detail, the reference numeral 10 has been applied generally to the dish constituting the present invention. In this connection, it should be noted at the outset that the dish can be molded of heat resistant glass or suiable material, in a single piece. Alternatively, the dish could be formed of metal pressed to shape.

In any event, the dish 10 is adapted to hold a plurality of graham crackers 12, or other flat, relatively hard crackers usable in making pie crusts.

The dish 10 includes a flat bottom 14, integral or otherwise rigid along its periphery with upstanding, vertically disposed, flat side walls 16.

The several sides 16 are so connected to the periphery of the bottom 14 as to define a peripheral depression 18, extending continuously about the bottom 14, the wall of said depression merging into the upper surface of the bottom 14, and merging also into the inner surfaces of the several sides 16 of the dish.

As will be seen from Figure 1, the pie dish formed in accordance with the present invention is of a diamond shape, the pie dish being of four-sided construction with two of the corners of the dish being of obtuse angular formation, the remaining two corners being of acute angular formation. The several corners of the dish are interiorly rounded as at 20.

In use of a pie dish formed in accordance with the present invention, it is merely necessary that the graham crackers 12 be inserted within the dish, in position against the several sides 16. By reason of the particular shape of the dish, the bottom edges of the graham crackers will be supported within the peripheral depression 18, thus to prevent the bottom portions of the graham crackers from swinging away from their associated sides 16.

Additionally, the particular shape of the dish is such as to cause the ends of the several crackers to engage one another, in a manner effective to cause the crackers to support each other against movement from their vertical positions. This can be readily perceived by studying Figure 1, it being seen from Figure 1 that any tendency of a cracker to swing inwardly is resisted by engagement of the cracker against a cracker adjacent thereto.

It is also thought to be of importance that the particular arrangement, wherein the corners are interiorly rounded as at 20, is designed specifically to cooperate with the diamond shape of the pie dish, in holding the crackers 12 in upright positions against the several sides 16 of the dish. In other words, the rounding of the corners prevents movement of each cracker 12 longitudinally of its associated side 16, when the crackers are engaged at their opposite ends by crackers adjacent thereto.

The final result obtained is to provide a pie dish in which a plurality of graham crackers or other crackers of similar characteristics can be deposited, with each cracker being supported against the inner surface of a side of the dish, the dish being so shaped as to cause all the crackers to support one another against said sides, while filling is being poured into the dish.

Of course, the dish can be used not only for pies, but for such foods as graham cracker sundaes, in which instance the crackers would be deposited in the dish in the same position shown in Figure 1, the sundae including ice cream, topping, etc. deposited in the interior space defined within the dish by said crackers.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

A pie dish formed as a four-sided receptacle of diamond shape, said receptacle having vertically disposed, fixedly connected, flat sides and a flat horizontal bottom rigid at its periphery with the respective sides, two of the several corners of the receptacle being of obtuse angular formation and the other two corners being of acute angular formation, for disposition of a plurality of crackers within the receptacle with each cracker overlying a side of the receptacle and with the ends of the crackers supporting one another at the several corners of the receptacle, said bottom having a peripheral depression at the juncture of the bottom and the sides for engaging the bottom edges of said crackers, each of said corners being interiorly rounded to provide means for preventing movement of the crackers longitudinally of their associated sides.

References Cited in the file of this patent

UNITED STATES PATENTS

| | | |
|---|---|---|
| 1,716,556 | Kones | June 11, 1929 |
| 2,028,671 | Kollman | Jan. 21, 1936 |
| 2,248,651 | Losberg | July 8, 1941 |
| 2,462,362 | Christensen | Feb. 22, 1949 |

FOREIGN PATENTS

| | | |
|---|---|---|
| 425,592 | France | Apr. 8, 1911 |